July 28, 1925.
R. B. JOHNSON
SHOCK ABSORBER
Filed April 26, 1924
1,547,923
2 Sheets-Sheet 1
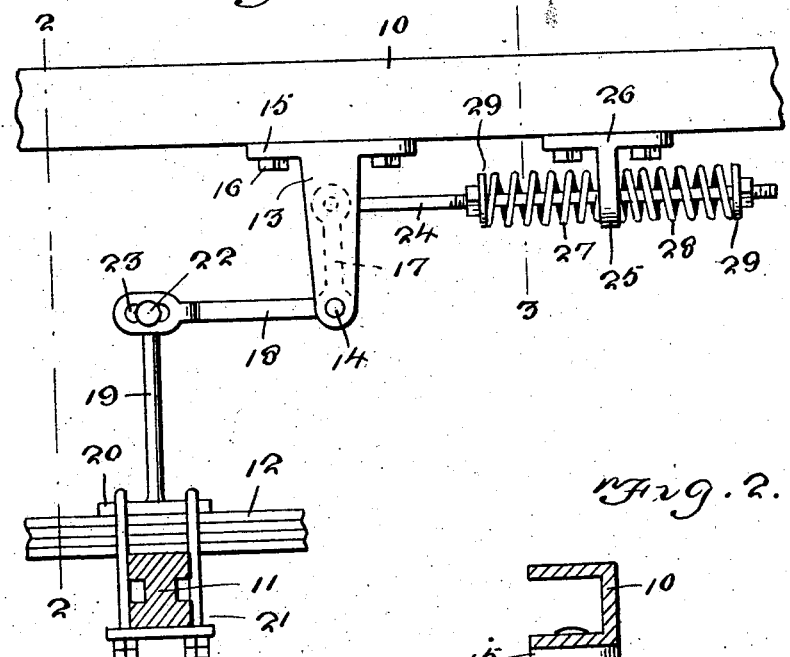
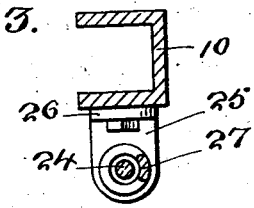
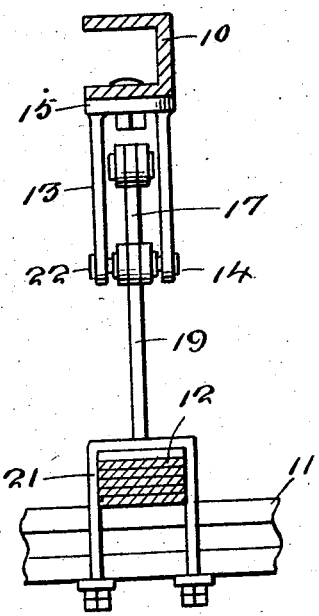
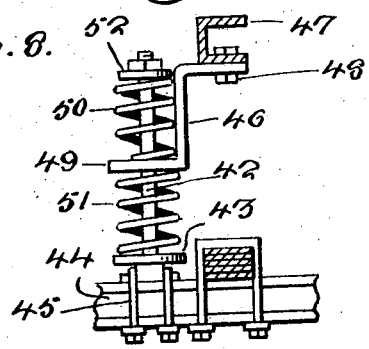
R. B. Johnson
INVENTOR
BY Victor J. Evans
ATTORNEY
E. R. Ruppert.
WITNESS:

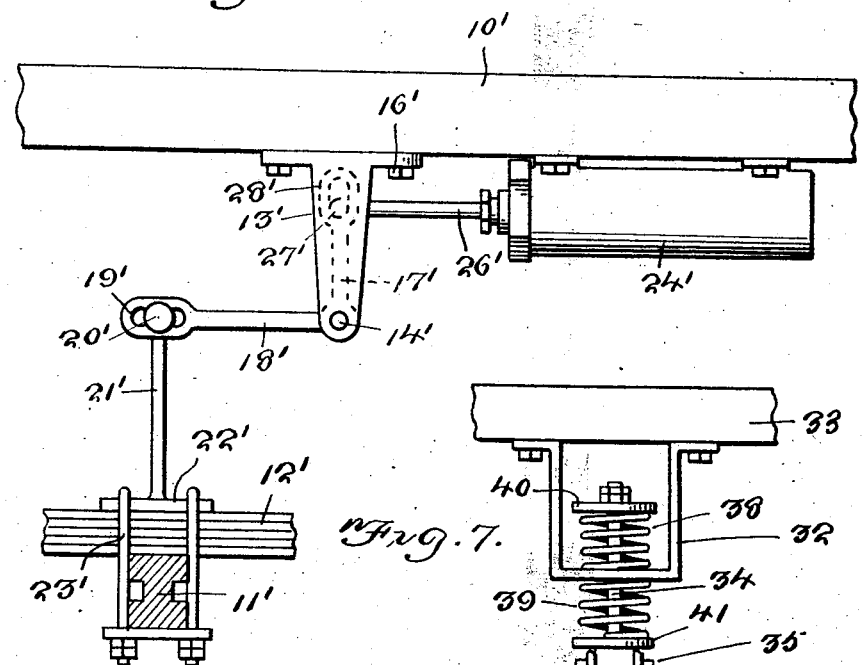
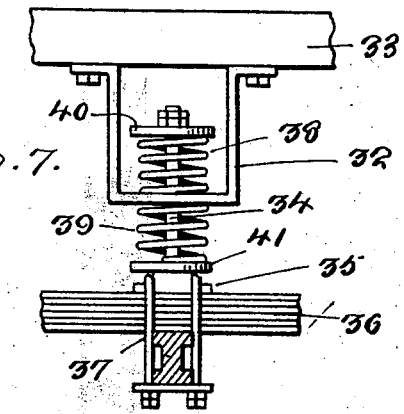
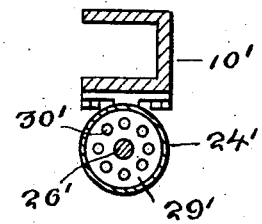
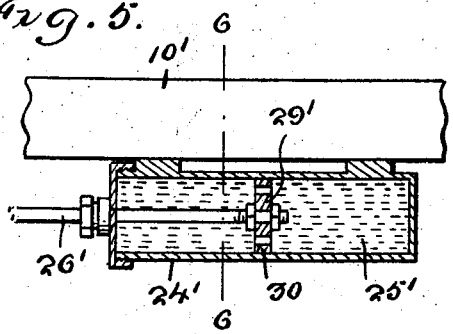

Patented July 28, 1925.

1,547,923

UNITED STATES PATENT OFFICE.

RUFUS B. JOHNSON, OF ATLANTIC CITY, NEW JERSEY.

SHOCK ABSORBER.

Application filed April 26, 1924. Serial No. 709,234.

*To all whom it may concern:*

Be it known that I, RUFUS B. JOHNSON, a citizen of the United States, residing at Atlantic City, in the county of Atlantic and State of New Jersey, have invented new and useful Improvements in Shock Absorbers, of which the following is a specification.

This invention contemplates the provision of a shock absorber for vehicles, and embodies a novel construction and arrangement of parts by means of which the vibration of the running gear of the vehicle is absorbed before it is transmitted to the body of the vehicle thereby insuring the car easy riding qualities.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary view of a vehicle showing one form of the invention in position for use.

Figure 2 is a sectional view taken on the line 2—2 of Figure 1.

Figure 3 is a sectional view taken on the line 3—3 of Figure 1.

Figure 4 is a view similar to Figure 1 of a modified form.

Figure 5 is a longitudinal sectional view through the dash pot.

Figure 6 is a sectional view taken on the line 6—6 of Figure 5.

Figure 7 is a view of a modified form of the invention.

Figure 8 is a view partly in section of another modified form of the invention.

Referring to the drawings in detail, and more particularly to Figures 1 to 3 inclusive, 10 represents the frame of the vehicle, the front axle thereof being indicated at 11, and the front springs for the vehicle at 12. In this form of the invention, I make use of a yoke like element 13 which is secured to the underside of the frame 10, depending therefrom, and pivotally supporting a bell crank lever as at 14. The yoke just referred to is formed with apertured lugs 15 to accommodate fastening elements 16 utilized to secure the yoke to the frame 10. The bell crank lever has its vertical branch 17 normally positioned between the spaced parallel members of the yoke 13, and its horizontal branch 18 projected forwardly of the yoke for connection with the rod 19 which rises from the spring 12. This rod is formed with a base 20 which reposes upon the spring 12, and held associated therewith by means of the usual spring clips 21. The upper end of this rod 19 is provided with a pin 22 which is received by an elongated slot 23 formed in the adjacent end of the bell crank lever, so that the operation of this lever is controlled by the vibrations or movements of the spring and axle with which it is associated. The upper end of the vertical branch 17 of said bell crank lever is terminally connected with horizontally disposed reciprocating rods 24, the rod being slidable through an apertured lug 25 forming part of a bracket 26, the latter being secured to the underside of the frame 10 at a point rearwardly of the yoke 13 above referred to. Encircling this rod at opposite sides of the apertured lug 25 are coiled springs 27 and 28 respectively, the adjacent inner ends of said springs bearing against the opposite sides of the lug 25, while the outer ends of these springs bear against disks 29 suitably secured to the rod 24. These springs are alternately compressed and expanded to absorb the shock and jars of the running gears incident to its travel over rough or irregular surface, and thus prohibits any vibratory motion being transported to the body of the vehicle.

In other words, when the axle springs are moved upwardly, the bell crank lever is moved upon its pivot in a direction to compress the spring 27 which of course absorbs the shock of the running gear under such circumstance, and when the axle is lowered incident to the rebound of the spring 12, the movement of the bell crank lever is reversed, whereupon the spring 28 is called into use, and compressed to absorb the shock for the purpose above stated.

In Figures 4 to 6 inclusive, I have shown a modified form of the invention, wherein the frame of the vehicle is indicated at 10', the front axle at 11' and the body spring at 12'. A yoke 13' of a construction similar to that hereinabove described is secured to the underside of the frame by means of suitable fastening elements 16'. The bell crank lever is pivoted as at 14' in the lower end of this yoke, and the vertical branch 17' of said lever is normally arranged between the spaced parallel portions of the yoke. The horizontally disposed branch 18' projects forwardly from the yokes and is formed adjacent its free end with an elongated slot 19' which receives a pin 20' carried by the upper end of the vertical rod 21'. This rod is formed with a base 22' which reposes upon the body spring and held associated therewith by the usual spring clips 23'. Secured to the underside of the frame 10 and at a point rearwardly of the yoke is a dash pot including a cylinder 24' adapted to contain a fluid indicated at 25' in Figure 5. A reciprocating rod 26' slides within this cylinder, and has its opposed extremity provided with a pin 27' which is received by a slot formed in the adjacent end of the vertical branch of said lever, and indicated at 28'. A piston 29' is arranged to reciprocate within the cylinder and is carried by the rod 26', and this piston is provided with a series of openings 30' to permit of its use in the ordinary well known manner.

In this form of the invention, the arrangement of parts is substantially the same as that described in combination with the preferred form, and it will be noted that when the front axle 11 of the vehicle is elevated incident to the travelling of the car over irregular surfaces, the bell crank lever is rocked upon its pivot, moving the rod 26' in a direction of the cylinder 24'; as the piston 29' moves toward one end of the cylinder, the fluid is compressed, being allowed to pass to the other end of the cylinder through the openings 30, and in this way, the movement of the piston is retarded sufficiently to absorb the shock of the running gear before its transmission to the body of the vehicle. When the front axle is lowered incident to the rebound of the spring the movement of the bell crank lever is reversed, and as the piston travels toward the other end of the cylinder, its movement is retarded in the same manner as just described and for the purpose mentioned. It will be noted that both forms of the invention are very simple in construction, and capable of being attached to any vehicle without requiring any alteration thereof.

In Figure 7 I have illustrated a modified form of the invention, wherein the shock absorber is arranged vertically in contradistinction to the arrangement illustrated in Figures 1 and 4. In this form of the invention, use is made of a substantially U-shaped bracket 32 which is attached to the frame 33 of the vehicle and depending therefrom. A reciprocatory rod 34 rises from a base 35 and passes thru an opening in the first member of the U-shaped bracket 32.

The blade 35 is secured to a spring 36 by means of the usual spring clip 37. Encircling the rod 34 above and below the bracket 32 are coiled springs 38 and 39 respectively, the adjacent convolutions of which bear against the upper and lower side of the cross piece of the U-shaped bracket 32. The upper end of the spring 38 bears against a disk 40 secured to the rod 34 while the lower end of a spring 39 bears against this portion 41 of the base. These springs are alternately compressed and expanded to absorb the shock jars of the running gear incident to the travel over the irregular surfaces, and thus prevent vibration transmitted from the running gear to the body of the vehicle.

In Figure 8, I have shown another modified form of the invention, wherein it will be noted that the rod 42 rises from a base 43 which is secured to the axle 44 instead of being secured to the body spring as shown in Figure 7. Clips 45 of well known construction are utilized to secure the base to the axle. A substantially V-shaped bracket 46 depends from the frame 47 of the car, one terminal of the bracket being secured to the frame as at 48 while the other terminal of the bracket is apertured to receive the rod 42. Encircling this rod above and below the terminal 49 of the bracket are coil springs 50 and 51 respectively, the adjacent ends of said springs bearing against the upper and lower sides of the bracket, while the upper end of the spring 50 is adapted to bear against a washer 52 secured to the rod. The lower end of the spring 51 is adapted to bear against the base and these springs are adapted to be alternately compressed and expanded to absorb the shock and jars in the manner stated.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A shock absorber for vehicles comprising a yoke secured to and suspended from the underside of the vehicle frame, a bell crank lever fulcrumed within the yoke adjacent the lower end thereof, and including a vertical branch and a horizontal branch, a plate adapted to repose upon the spring of the vehicle, means for clamping the plate to said spring, a rod rising centrally from said plate and terminating to provide an offset extension, the adjacent end of said horizontal branch for the bell crank lever being provided with a slot to receive said extension, a bracket depending from the frame of the vehicle in spaced relation to said yoke and having an opening therein, a reciprocatory rod arranged in a horizontal plane to slide through the opening in said bracket, and having one end connected with the adjacent end of the vertical branch of said lever, said rod being threaded at spaced points, coil springs surrounding said rod at the opposite sides of said bracket and having their adjacent ends bearing against the latter, disks arranged on said rod and engaged by the outer ends of said springs, and nuts threaded on said rod and adjustable to vary the tension of said springs and to hold the latter operatively associated with said rod for the purpose specified.

In testimony whereof I affix my signature.

RUFUS B. JOHNSON.